United States Patent

[11] 3,620,317

| [72] | Inventor | Nelson R. Henry |
| | | 583 Willivee Drive, Decatur, Ga. 30033 |
| [21] | Appl. No. | 33,150 |
| [22] | Filed | May 4, 1970 |
| [45] | Patented | Nov. 16, 1971 |
| | | Continuation of application Ser. No. 675,125, Oct. 13, 1967. This application May 4, 1970, Ser. No. 033,150 |

[54] AUTOMATIC FILLING AND WEIGHING MECHANISM
21 Claims, 12 Drawing Figs.

[52] U.S. Cl. ................................................ 177/54,
177/83, 177/123, 177/160
[51] Int. Cl. ....................................................... G01g 13/00
[50] Field of Search ............................................ 177/52-54,
83-85, 88, 116, 117, 122, 123, 160

[56] References Cited
UNITED STATES PATENTS

| 1,861,443 | 6/1932 | Holzapfel | 177/160 X |
| 2,634,085 | 4/1953 | Allen et al. | 177/54 |
| 3,057,382 | 10/1962 | Baker | 177/58 X |
| 3,073,399 | 1/1963 | Durand | 177/53 |
| 3,089,554 | 5/1963 | Watson | 177/52 |
| 3,215,173 | 11/1965 | Rutherford | 177/160 X |
| 3,225,847 | 12/1965 | Vergobbi et al. | 177/52 |
| 3,416,619 | 12/1968 | McClusky | 177/53 |
| 3,416,620 | 12/1968 | McClusky | 177/123 |
| 3,468,349 | 9/1969 | Davis et al. | 177/160 X |

*Primary Examiner*—Richard B. Wilkinson
*Assistant Examiner*—George H. Miller, Jr.
*Attorney*—Newton, Hopkins and Ormsby

ABSTRACT: Automatic filling and weighing mechanism in which successive receptacles are moved in a prescribed path to a bulk-weighing station, then to a final weighing station, and then to a discharge station. When a receptacle is positioned at a bulk-weighing station, a great majority of the weight of material is fed by a conveyor to the receptacle and when the receptacle is thereafter positioned at the final weighing station, a conveyor adds sufficient material to complete the weight for the receptacle. Automatic mechanisms control the conveyors at the respective stations, the feed being altered when a prescribed amount is received by a receptacle. An interlock mechanism detects the presence of a receptacle at a station and a discharge mechanism automatically discharges the receptacle at the discharge station.

INVENTOR.
NELSON R. HENRY
BY Newton, Hopkins, Jones & Ormsby
ATTORNEYS

INVENTOR.
NELSON R. HENRY
BY Newton, Hopkins, Jones & Ormsby
ATTORNEYS

PATENTED NOV 16 1971

INVENTOR.
NELSON R. HENRY
BY Newton, Hopkins,
Jones & Ormsby
ATTORNEYS

AUTOMATIC FILLING AND WEIGHING MECHANISM

This is a continuation of application Ser. No. 675,125 filed Oct. 13, 1967.

This invention relates to an automatic filling and weighing mechanism and is more particularly concerned with a machine which passes successive receptacles along a prescribed path, stopping periodically at a bulk-filling station, at a final weighing station, and then discharging the filled and weighed receptacles.

In the past, potatoes, onions, apples, nuts, citrus fruits, and perhaps other vegetables and produce have been packaged in 50-pound and 100-pound burlap sacks. At times, large paper bags or plastic bags have been used in place of the burlap sacks. The mechanism conventionally used for filling such relatively large receptacles has been a conveyor having deflecting blades which direct the products to spaced gates, at which operators are stationed. The operator at each gate raises the gate to discharge the products into a bag mechanically held in place. Thereafter the bag is manually transferred to a weighting station where sufficient products are added or removed from the bag to make up the proper weight.

Attempts, in the past, have been made to provide automatic mechanisms for filling and weighing these relatively large burlap sacks, however, none of the machines, to my knowledge, has received widespread acceptance. Reviewing briefly these machines, one machine passes the bags on individual scales past a filling station where the operator manually controls the location of the bag-supporting mechanism and manually controls the feed of material to the bags. Of course, the accuracy and speed of the operation of such a mechanism depends upon the skill of the operator and the mechanism requires constant attention.

Another prior art bag-filling mechanism passes a plurality of bags supported on individual weighing mechanisms past the discharge end of a conveyor feeding the produce and provides for the lifting of individual block gates, when prescribed amounts of material have been received in associated bags. This mechanism requires a constant supply of material and therefore must return any excess for refeeding. Furthermore, there is danger of cutting the produce, such as potatoes, as a gate is raised. Also, such a device must have a scale for each bag in the series.

Other automatic rotary baggers, as they are sometimes termed, have been introduced to the market, including the type wherein a cone-shaped pan directs the articles radially from the center of the machine toward the gates which are opened and closed in response to weighing mechanisms which support the bags adjacent thereto.

U.S. Pat. No. 3,057,382 and 2,634,085 disclose still other types of filling and weighing mechanisms.

Briefly described, the automatic filling and weighing mechanism of the present invention includes a turntable or indexing member which is rotated about a vertical axis a prescribed amount, upon each cycle of the machine. Extending radially from this indexing member are a plurality of circumferentially spaced, supporting members which carry the supporting frames for the bags. Through the parallelogram arrangement of the supporting members, the frames are rendered capable of being individually moved upwardly and downwardly while being carried in a rotary or orbital path. Each supporting frame is provided with an adjustable chute, means for suspending the bag and a sway-arresting arm which prevents swaying of the bag. A bottom rest plate at the bulk-filling station is moved into position to support the bottom of the bag.

The indexing member incrementally moves the frames to present successive frames to respective stations of the mechanism. The first station is a receptacle-receiving station at which the receptacle, such as a bar, is manually installed in the mechanism. The second station is a bulk material weighing or filling station; the third station is a final weighing station and the fourth station is a bag discharge station. Moving progressively from one station to the next, with sufficient dwell time between each move, a particular bag-supporting frame receives a bag, holding it in an open position; then is moved to the bulk-weighing station where the bag, being supported both from the top and from the bottom, receives from a bulk conveyor the bulk of the material to make up a prescribed weight. Thereafter, when a prescribed weight of material has been received, the indexing member is indexed so as to prevent the frame and its partially filled bag to the final weighing station where an accurate scale weighs the bag and material, as a dribble or trim feed conveyor feeds the final amount of material to the bag. Thereafter, the indexing member moves the frame and its filled bag to the discharge station where the bag is automatically dropped into a receiving zone for removal.

The machine of the present invention, intermittently automatically indexes with approximately a 2-second delay or dwell between each indexing cycle, provided the machine is operating with no bags installed on the bag-supporting frames. With a bag installed on any one of the frames, however, an interlock system permits the indexing to be accomplished, only after such bag has been filled to predetermined weight of product at the bulk-filling station and only after, in a subsequent cycle, its final weight of product is received at the final weighing station. The interlock system also causes the mechanism to stop cycling and hold a bag in position for receiving material at each of the respective weighing stations, in the event that no material or insufficient material is supplied by the conveyors. Therefore, it is only after a prescribed amount of material has been received in a bag that the machine indexes, when it has a bag in the machine.

Accordingly, it is an object of the present invention to provide a practical and durable automatic filling and weighing mechanism for filling and weighing large bags, sacks, or other receptacles with a minimum of supervision and manual labor.

Another object of the present invention is to provide an automatic filling and weighing mechanism which will operate automatically and is independent of the skill of the operator in both filling and weighing successive receptacles.

Another object of the present invention is to provide an automatic filling and weighing mechanism which automatically will rapidly fill and accurately weigh receptacles.

Another object of the present invention is to provide an automatic filling and weighing mechanism which will rapidly fill successive receptacles with a majority of the material to be received therein and slowly fill the final quantity of material therein.

Another object of the present invention is to provide an automatic filling and weighing mechanism in which bags are readily and easily installed for filling and which will automatically discharge the bags after they have been filled and weighed.

Another object of the present invention is to provide an automatic filling and weighing mechanism which will release the weighted and filled bags without the necessity of stopping the operation of the mechanism.

Another object of the present invention is to provide an automatic filling and weighing mechanism which, during its filling operations, will support bags both at the top and the bottom so as to maintain the shape of each bag to provide a maximum receiving area as the bag is filled.

Another object of the present invention is to provide an automatic filling and weighing mechanism in which the prescribed weight to be filled in each bag may be readily and easily set and, subsequently, readily and easily altered, as desired.

Another object of the present invention is to provide an automatic filling and weighing mechanism which requires no recycling of the material to be filled into the bags and will gently and easily handle such material.

Another object of the present invention is to provide, in an automatic weighing and filling mechanism, an arrangement by which the presence or absence of a bag is automatically ascertained for controlling the discharge of material at a prescribed station.

Another object of the present invention is to provide an automatic filling and weighing mechanism in which a receptacle is retained in an arrested condition as it is filled.

Another object of the present invention is to provide a bag filling and weighing mechanism employing only a single accurate scale for final weighing and in which there is little or no lateral force transmitted to the scale during the operation of the machine.

Another object of the present invention is to provide an automatic filling and weighing mechanism which will automatically dwell when the material to be filled into the bags is no longer supplied and yet will automatically commence cycling again upon material again being supplied.

Another object of the present invention is to provide an automatic filling and weighing mechanism in which the bags, both filled and partially filled, are handled in an easy and gentle manner.

Another object of the present invention is to provide an automatic filling and weighing mechanism which is capable of receiving and weighing mechanism which is capable of receiving and filling a variety of receptacles, without material alteration to the structure of the mechanism.

Other objects, features, and advantages of the present invention will become apparent from the following description when taken in conjunction with the accompanying drawings wherein like characters of reference designate corresponding parts throughout the several views and wherein.

Figure 1:
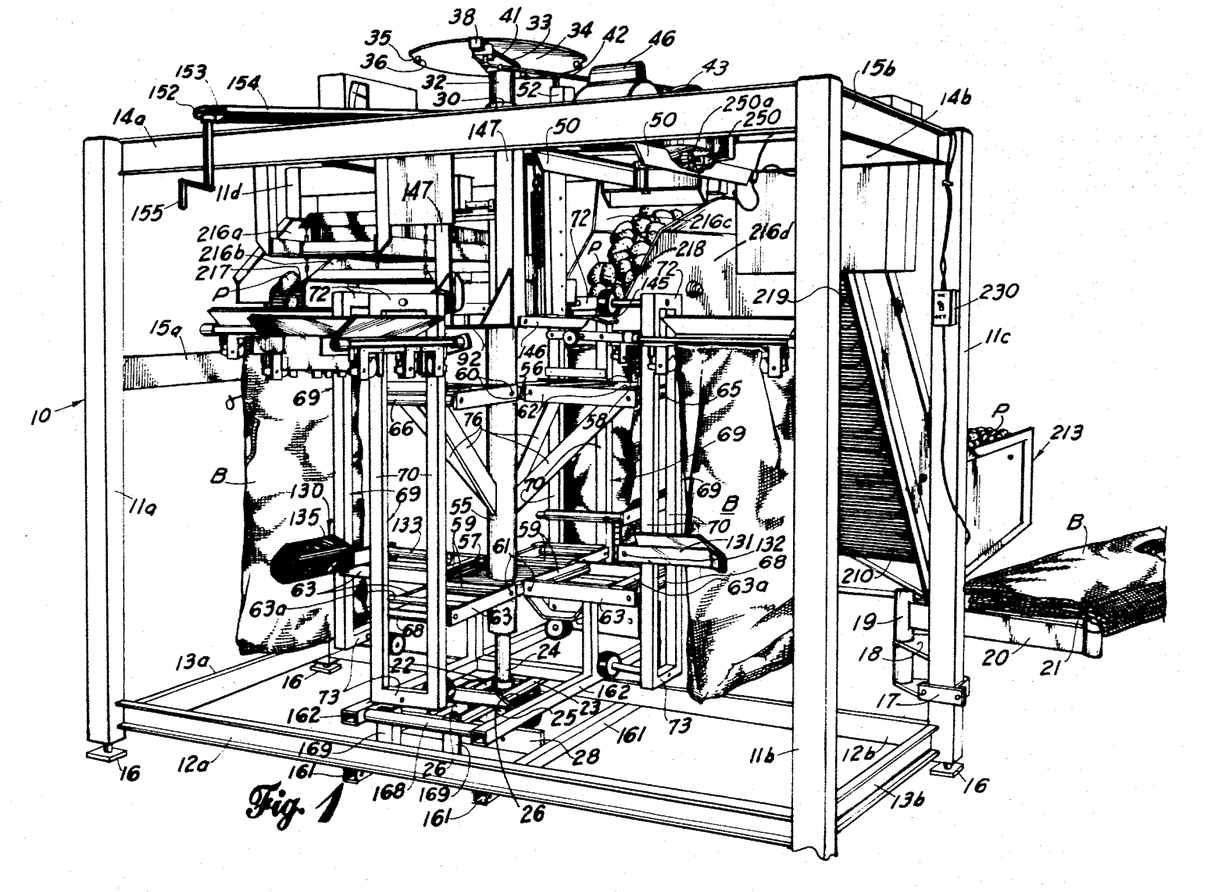
FIG. 1 is a front perspective view of a filling and weighing mechanism constructed according to the present invention.

Referring now in detail to the embodiment chosen for the purpose of illustrating the present invention, it being understood that in its broadest aspects, the present invention is not limited to the exact details herein depicted, numeral 10 denotes generally the main turntable frame of the indexing member of the bag filling and weighing mechanism illustrated in the drawings. Frame 10, seen best in FIG. 1, is an open rigid boxlike structure of spaced parallel uprights 11a, 11b, 11c and 11d. The lower end portions of the front uprights 11a, 11b are joined by a longitudinally extending base rail 12a while a similar rail 12b extends from rear upright 11c to the rear upright 11d parallel to the rail 12a. Furthermore, a pair of parallel transversely extending rails 13a and 13b extend respectively between the uprights 11a and 11d and the uprights 11b and 11c. It is, therefore, seen that a lower horizontal rectangular frame is provided by the rails 12a, 12b, 13a and 13b.

An upper frame is provided between the uprights 11a, 11b, 11c, and 11d. This upper frame includes a pair of parallel longitudinally extending rails 14a and 14b and a pair of parallel transversely extending rails 15a and 15b.

At the lower ends of the uprights 11a and 11b and 11c and 11d, respectively, are adjustable feet, such as foot 16, by means of which the main turntable frame 10 is supported in an elevated position so that the lower horizontal frame is spaced above the floor in a building housing the machine.

Figure 5:
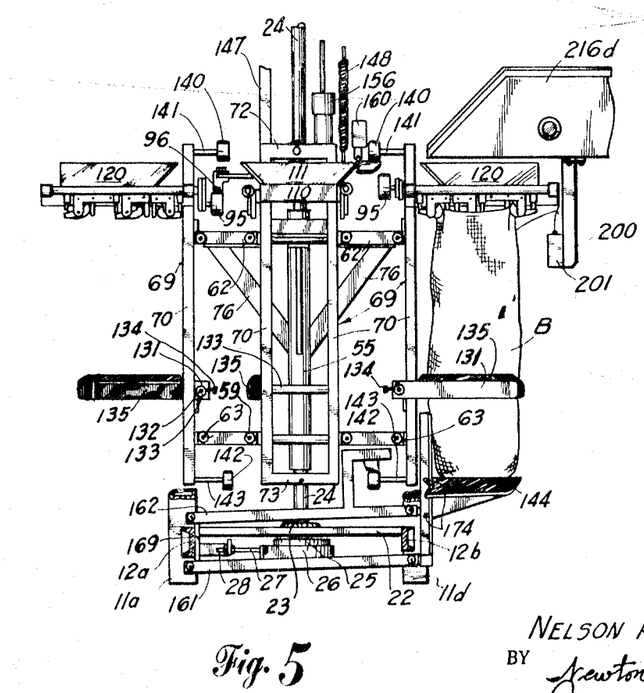
FIG. 5 is a sectional side elevation of a portion of the machine shown in FIG. 1 showing the central shaft and bag-supporting receptacles.

The upright 11c, at its lower end portion, is provided with an adjustable clamp 17 which carries a sidewise extending bracket 18, the bracket 18 having upright shaft (not shown) which receives a sleeve 19, the sleeve supporting, in cantilever fashion, pivot arm 20 which, in turn, pivotally supports a platform 21. The platform 21 carries a plurality of burlap, paper, or plastic bags or other suitable receptacles. In the present embodiment, I have disclosed the machine as functioning with burlap sacks, denoted by the latter B; however, the inventive concept of the present invention is suitable for use in connection with the filling of a variety of receptacles. The platform 21 supports a stack of bags or sacks B in a convenient position for the operator to install the bags B successively onto the machine, as will be described hereinafter. Of course, the pivotal mounting of platform 21 permits it to be rotated to a number of positions while the clamp 17 permits the platform 21 to be raised or lowered to suit the operator. In the central portion of the lower frame, as seen in FIG. 5, there is a crossbar frame 22 which supports a lower main bearing 23. The bearing 23, in return, carried an upstanding central shaft 24 which projects through the main frame 10 and above the upper frame. The central shaft 24 also projects below the bearing 23 and is provided with a cylindrical brake drum 25 at its lower end, the brake drum 25 receiving a flexible brake shoe 26, therearound. The ends of brake shoe 26 are connected to tie bolts, such as tie bolt 27, and a crossbar 28 on the lower frame. Thus, rotation of shaft 24 is retarded, but not arrested, and the revolving center section is prevented from overriding its index station due to momentum.

INDEXING MECHANISM

Figure 4:
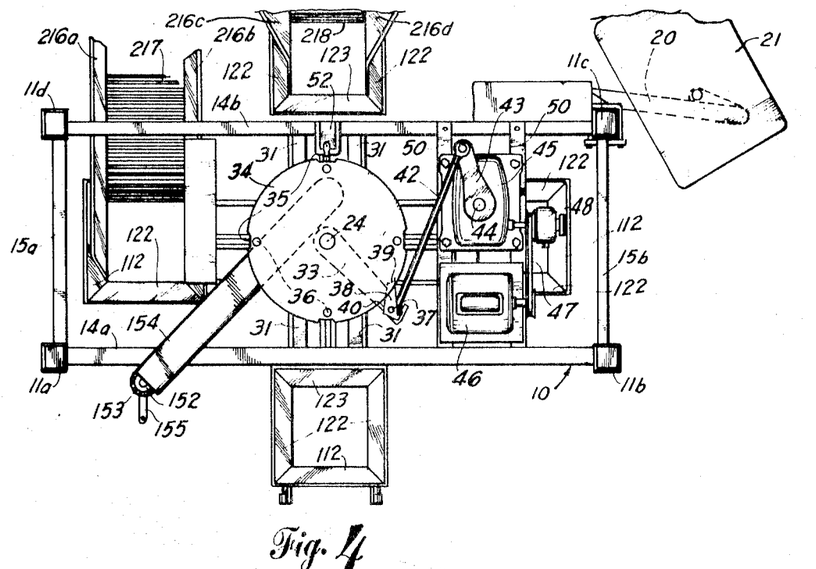
FIG. 4 is a top plan view of the machine shown in FIG. 1.

At the upper end portion of the shaft 24 is an upper main bearing 30 which is carried by a pair of transversely extending central ribs 31, extending between the central portions of the rails 14a and 14b, as seen in FIG. 4. Rotatably carried by the shaft 24, above the bearing 30, is a collar 32 from the upper end of which projects, in a radial direction, a crank arm 33. Mounted on the upper end portion of the shaft 24, above and spaced from the crank arm 33 by a hub (not shown), is a circular indexing plate 34. The indexing plate 34, each 90° along its periphery, is provided with circumferentially spaced recesses 35, best seen in FIG. 4. Respectively inwardly of the recesses 35 on the lower surface of the indexing plate 34 are a like number of downwardly protruding stub shafts 36.

The crank 33 protrude beyond the periphery of the indexing plate 34 in a plane below the plane of the lower ends of stub shaft 36. The outer end portion of crank arm 33 is provided with an upstanding pivot pin 37, the pivot pin 37 carrying a pivotable spring-loaded pawl 38 which projects sidewise of the crank arm 33 and inwardly, the pawl 38 being provided with a concave end 39 for engagement with successive stub shafts 36. The pawl 38 has a camming surface 40 and is biased so as to ride over each shaft 36 in the return movement of the arm 33.

For reciprocating the arm 33 through an arc slightly in excess of the spacing of adjacent shafts 36, i.e., in excess of 90°, so as to index an indexing plate 34 through a 90° arc in a counterclockwise direction, as viewed in FIG. 4, the crank arm 33 is provided at its outer end with a downwardly extending pivot pin 41 which pivotally receives one end of control rod 42. The other end of control rod 42 is pivotally connected to the free end of a pitman 43 which is carried for rotation by an upstanding shaft 44 on a gear reducer 45. The gear reducer 45, in turn, is driven from a motor 46 by a belt 47 through an electrical clutch 48. The gear reducer 45 and motor 46 are carried on a pair of transversely extending ribs 50 which extend between the rails 14a and 14b, as seen in FIG. 4.

The motor 46 is driven, throughout the time that the machine is turned on and, periodically, the clutch 48 is energized so as to rotate the shaft 44 through one revolution, as will be more fully explained hereinafter.

Positioned on the central portion of rail 14b is a microswitch 52, the switch arm of which is adapted to ride along the periphery of the indexing plate 34 and fall into any one of the recesses 35 which is aligned therewith. When a recess 35 is aligned with the switch arm of the microswitch 52, the indexing plate 34 and shaft 24 have been properly indexed.

RECEPTACLE SUPPORTING MEMBERS

The bag or receptacle supporting members are the radially extending mechanisms which support, transport, and release the bags. These members are identical to each other and are spaced 90° apart around the shaft 24.

In more detail, on the central portion of the vertically disposed main shaft 24 is an enlarged tubular sleeve 55 which is larger in diameter than shaft 24 and is concentrically received thereon. End plates (not shown) secure the ends of sleeve 55 to shaft 24. The sole purpose of sleeve 55 is to provide an enlarged welding area for receiving various elements, to be described hereinafter, and thereby protect shaft 4 from possible being bent.

Two flat vertically spaced square platforms 56 and 57 are secured to and carried by sleeve 55, the sleeve 55 passing through the center of each. The edges of the upper platform 56 are provided with journal members 58 while the edges of lower platform 57 are provided with journal members 59. Pivot shafts 60 are received respectively in the journal members 58 while pivot shafts 61 are received respectively in journal members 59.

The ends of the shafts 60 and 61 protrude outwardly of their journal members 58 and 59 and they pivotally carry respectively outwardly extending pivot arms, the shafts 60 carrying opposed parallel pivot arms 62 and the shafts 62 carrying opposed parallel pivot arms 63. Crossbars 62a and the 63a connect the outer end portions of each opposed parallel pair of arms 62 and 63.

Figures 6, 7, 8:
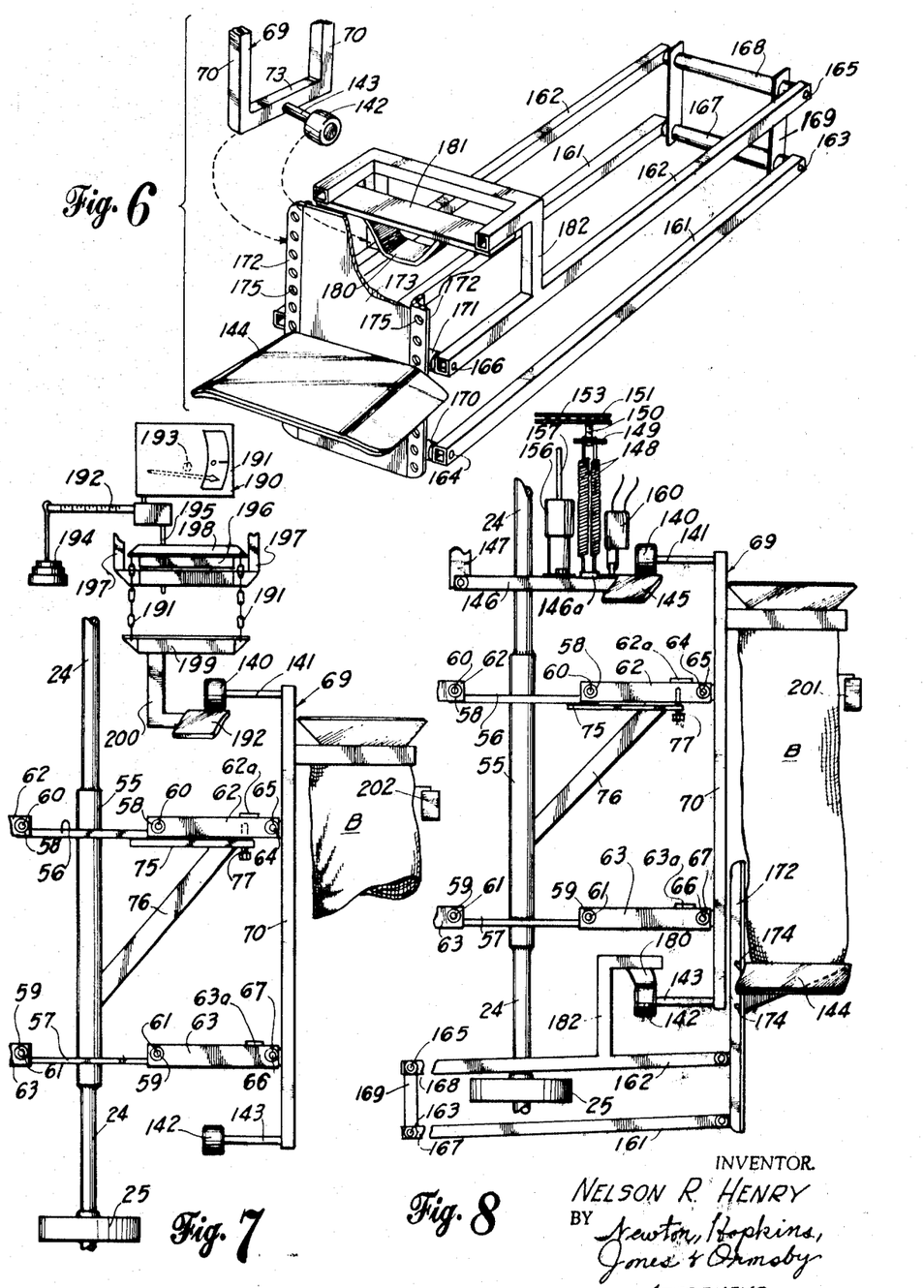
FIG. 6 is a perspective detail view of a portion of the machine shown in FIG. 1 showing the operation of the receptacle-supporting mechanism in relation to the bag stand at the bulk-filling station.
FIG. 7 is a schematic side elevation of a portion of the machine shown in FIG. 1 showing the receptacle-supporting mechanism at the trim-filling station.
FIG. 8 is a schematic side elevational view of portion of the machine shown in FIG. 1 showing the bag-supporting mechanism at the bulk-weighing station.

The arms 62 and 63 normally extend outwardly on opposite ends of and perpendicular to sleeve 55. As seen in FIG. 7, the outer pivot shafts 64, which carry upper journal members 65, extend between the outer end portions of arms 62 while pivot shafts 66, which carry lower journal members 67, extend between the outer end portions of arm 63. The arrangement is such that each associated pair of upper and lower journal members 65 and 67 is disposed in a vertical plane parallel to a tangent of sleeve 55, the vertical planes being circumferentially spaced 90° from each other around the sleeve at equal distances therefrom. Secured to the outer surfaces of each pair of associated journal members 65 and 66 is rectangular bag-carrying frame 69, this frame 69 consisting of a pair of spaced parallel vertical bars 70, the ends of which are joined by upper and lower horizontal bars 72 and 73.

It is, therefore, seen that due to the fact that the vertical distance between associated journal members 58 and 59 is equal to the vertical distance between associated journal members 65 and 67, the upper arms 62 of each bag-supporting member remain parallel to the lower arms 63 thereof, regardless of the angular positions of such arms with respect to the axis of sleeve 55. This parallelogram arrangement permits the bag-carrying frame 69 to remain vertical and yet be capable of being moved upwardly and downwardly, as arms 62 and 63 pivot about shafts 60 and 61.

To maintain the arms 62 and 63 in essentially a horizontal position and yet permit upward movement of frame 69, a radially extending stationary strap 75 is provided between each pair of arms 62, the inner end of the strap 75 being secured to upper platform 56 and the outer end of each strap 75 being supported by an outwardly and upwardly angling brace 76. The outer end portion of each strap 75 receives a bolt 77 threadedly therethrough, the upper end of bolt 77 abutting and arresting downward movement of crossbar 62a. By manipulation of its associated bolt 77, the vertical position of each frame 69 may be incrementally adjusted through a limited range.

RECEPTACLE RETAINING MEMBERS

Figure 9:
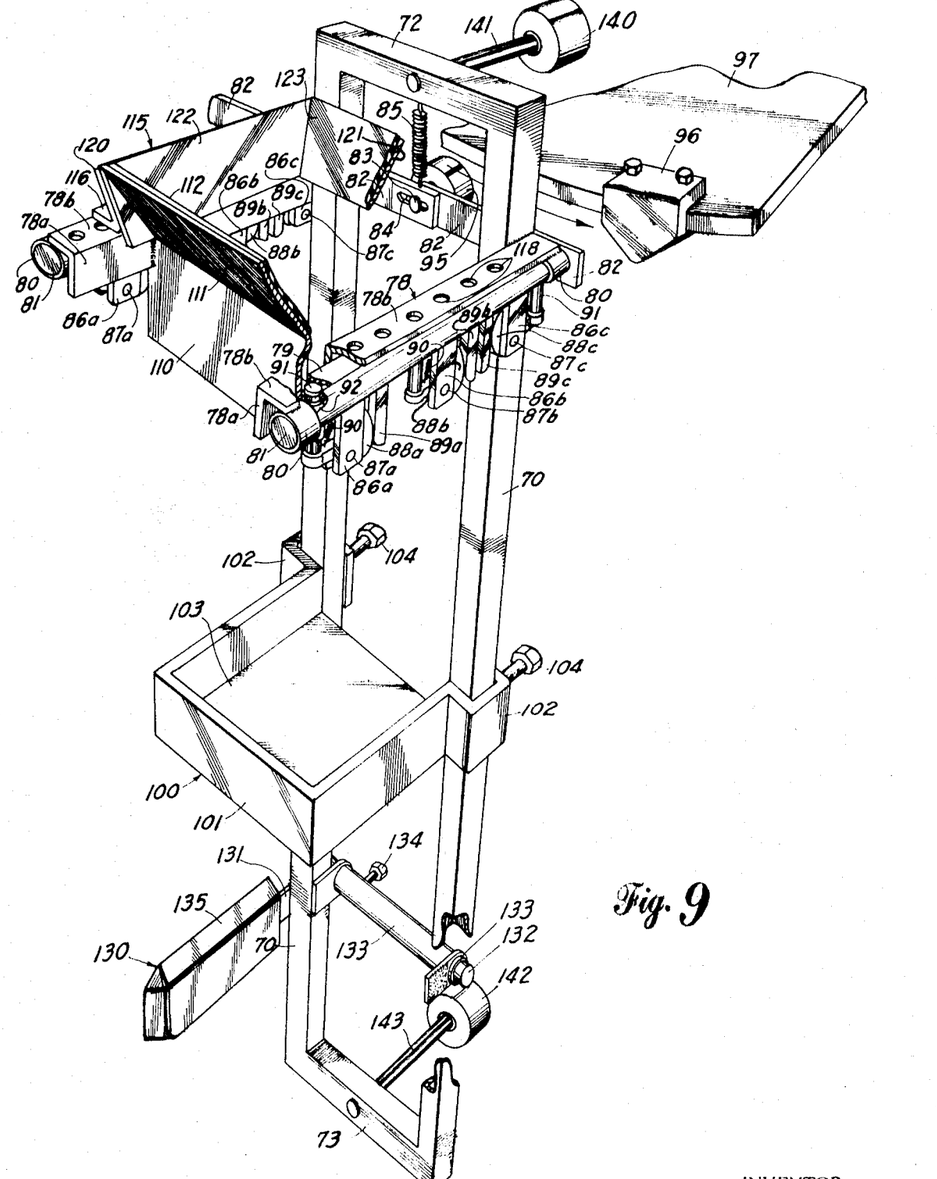
FIG. 9 is an enlarged fragmentary perspective view of a portion of the receptacle supporting mechanism of the machine shown in FIG. 1, alternate receptacle-retaining members being illustrated thereon.

As one form of receptacle-retaining member for releasably receiving and supporting a bag or sack B with its mouth open for receiving article, each frame 69 is provided, at its upper end portion, with a bag-suspending mechanism which, as best seen in FIG. 9, includes a pair of outwardly extending parallel brackets 78, the brackets 78 being respectively welded, at their inner end portions to the arms 70 of the frame 69. The brackets 78 are angle irons, each having a vertically disposed flange 78a and a horizontally outwardly projecting flange 78b.

Carried beneath each of the outwardly projecting flanges 78b are a pair of aligned bearings 80. Each pair of bearings 80 journals for rotation a rocker shaft 81. Between the bearings 80, each rocker shaft 81 is respectively provided with an inwardly extending actuator plate 79. Upon rotation of rocker shafts 81, the actuator plates 79 cause release of the supported bag B, as will be explained more fully hereinafter.

The inner ends of rocker shafts 81 are provided with opposed inwardly projecting levers 82, the ends of which overlap so as to be pivotally an telescopically connected together by a pin 83, projecting from one lever 82 into an elongated slot 84, in the other lever 82. A coiled spring 85, connected between upper horizontal bar 72 and levers 82, yieldably urges the levers 82 to their uppermost position.

Projecting downwardly from the horizontal flanges 78b, between the vertical flanges 78a and their associated shafts 80, are opposed pairs of gripper supporting brackets 86a, 86b, and 86c. The forward or outer gripper supporting brackets 86a pivotally support, by means of pivot pin 87a, an L-shaped gripper 88a, the pivot pin 87a projecting through a horizontally disposed portion of the gripper 88a. In like manner, brackets 86b and 86c are provided with L-shaped grippers 88b and 88c, pivotally supported by pins 87b and 87c.

Downwardly projecting bag-arresting rods 89a, 89b, and 89c, carried by vertical flanges 78a, project parallel to and respectively along sides of the upstanding arms of the L-shaped grippers 88a, 88b, and 88c, while individual springs 90 respectively yieldably urge the friction surfaces of the upstanding arms of the grippers 88a, 88b, and 88c into engagement with rods 89a, 89b, and 89c. It will be understood that since the pins 87a, 87b, and 88c, are off center in the L-shaped grippers 88a, 88b, and 88c, the upper edge portions of a bag will seat readily inserted upwardly between a gripper and its associated rod while any downward force on the bag B will seat more firmly the upstanding arm of the gripper toward its associated rod.

For releasing a bag B from the grippers 88a, 88b, and 88c, the bag-suspending mechanism includes a plurality of adjustable pusher pins, such as pin 91, slidably carried in a collar, such as collar 92. The collars, such as collar 92, are secured to the vertical flanges 87a so as to dispose a pusher pin 91 over the outer end of each of the horizontal arms of the L-shaped grippers 88a, 88b, and 88c. The upper end of all pins 91 are immediately below the actuator plates 79 so that upon pivotal movement of rocker shafts 81, all pins 91 will be depressed, thereby simultaneously pivoting all grippers 88a, 88b, and 88c away from their associated rods 89a, 89b, and 89c, whereby bag B is released.

Such pivotal movement of rocker shafts 81 is accomplished upon downward movement of pin 83 against tension of spring 85. For this purpose, a bag release roller 95 is carried by the inner end of pin 83 and projects inwardly of frame 69 to engage a cam 96 carried on the peripheral edge of cam-supporting plate 97 when the particular bag-suspending mechanism is moved therepast.

The purpose of the three opposed pairs of rippers 88a, 88b, and 88c is to accommodate various size bags B. Thus, when 50-pound bags B are to be used, an upper edge portion of a 50-pound bag is inserted between the two front grippers 88a and their associated rods 89a and another part of the upper edge portion of the 50-pound bag B is inserted between the two next grippers 88b and their associated rods 89b. On the other hand, when a 100-pound bag B, i.e., a bag with a larger mouth is used, the upper edge portion of such bag B is gripped between grippers 88a, 88c and their associated rods 89a and 89c.

As pointed out above, an operator, standing adjacent the platform 21, installs a bag B on each bag suspending mechanism, as each bag-carrying member is stopped adjacent to him in a bag-receiving zone or station. The suspended bag B is then carried to the next quadrant of the machine which is the bulk material feeding station or zone and then to the next quadrant which is the final weighing station or zone and thence to the next quadrant which is bag discharge station or zone where each bag B is automatically discharged.

SECOND EMBODIMENT OF RECEPTACLE RETAINING MEMBER

While the present specification is directed primarily to a mechanism which functions to fill flexible bags B, there are times when the present machine will be used for filling and weighing relatively rigid receptacles, such as corrugated boxes. In such a case, the box-supporting platform 100, seen in FIG. 9, is installed on frame 69. In more detail, the platform 100 includes a U-shaped sidewall strap 101, the ends of which form opposed channel members 102.

The U-shaped strap 101 supports by its lower edges a flat rectangular plate 103, the three edges of plate 103 conforming to the shape and being connected to the three sides of strap 101.

The channels of channel members 102 are disposed along vertical parallel axes and open inwardly in opposed relationship, for, respectively receiving bars 70. Bolts 104 passing through the channel members 102, releasably secure the channel members 102, releasably secure the channel members 102 in place so as to dispose plate 103 in a horizontal position. When bolts 104 are loosened, the platform 100 may be raised or lowered with respect to or removed from the frame 69.

ADJUSTABLE CHUTE

Figure 10:
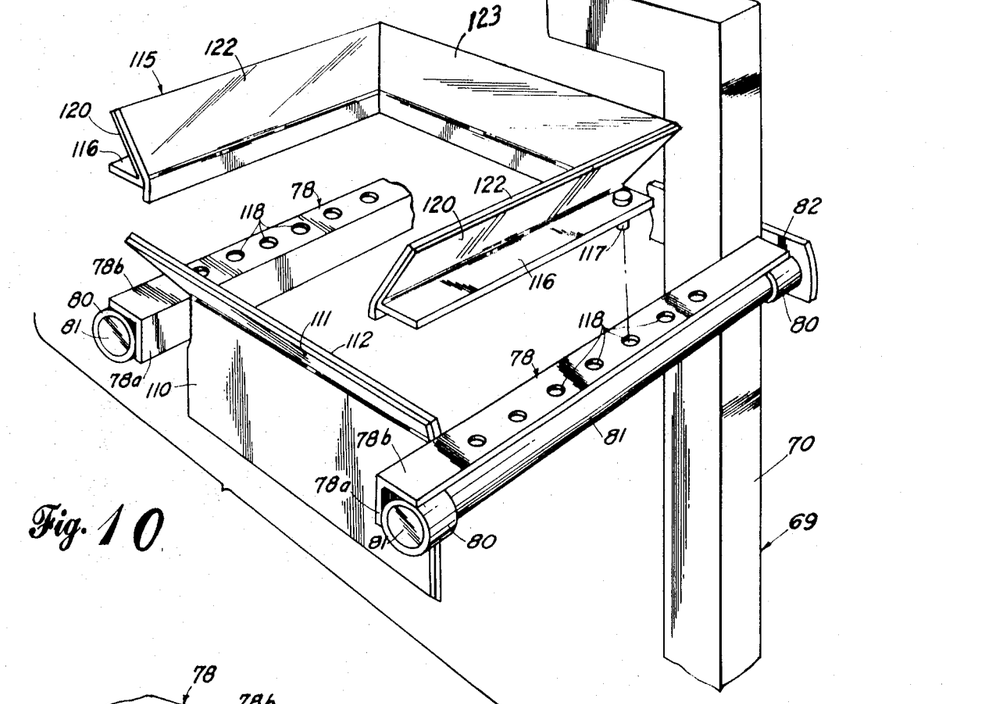
FIG. 10 is an exploded perspective view of the article guide chute of one of the receptacle-retaining members of the machine shown in FIG. 1.
Figure 11:
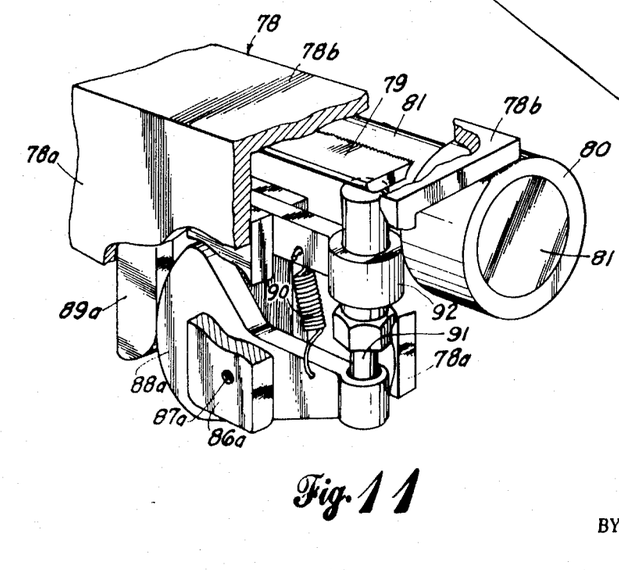
FIG. 11 is an enlarged perspective view of a portion of one form of the receptacle-retaining member of the machine shown in FIG. 1; and, FIG. 12 is a wiring diagram of the electrical circuit of the machine shown in FIG. 1.

The adjustable chute, as best seen in FIG. 10, includes a vertically disposed end plate 110 which extends transversely across the opening defined by the vertical flanges 78a. Plate 110 is welded in place in approximately transverse alignment with rods 89a. Projecting upwardly and outwardly from the upper edge of plate 110 is a deflector lip 111. A rubber or resilient sheet 112 extends across the inner surface of lip 111.

The adjustable portion of the chute consists of a removable U-shaped guide member, denoted by numeral 115. The guide member 115 has a pair of opposed parallel rectangular baseplates 116 which are adapted to rest in registry respectively on the upper surfaces of flanges 78b. Spaced depending positioning pins 117 extend from the plates 116 and are selectively received in holes 118 in flanges 78b. The holes 118 in each flange 78b are evenly spaced and in alignment with each other so as to provide parallel rows of holes 118. By shifting guide member 115 outwardly or inwardly, pins 117 may be brought into alignment with selected holes 118 and then inserted therein upon downward movement of member 115.

Projecting upwardly, in diverging fashion, are a pair of opposed deflector lips 120 which are integrally joined along their lower edges to the inner edges of plates 116. The inner ends of lips 120 are joined by an end deflector lip 121 which is arranged to be disposed opposite lip 111, the two lips diverging upwardly. Rubber or resilient sheets 122 respectively cover the inside surfaces of lips 120 while similar sheet 123 covers the inside surface of lip 121.

The guide member 115 is sufficiently flexible that it may readily be positioned on opposite sides of lip 111 so as to abut the upwardly diverging edges of lip 111 as the pins 117 are received in holes 118. Through appropriate adjustment, as explained above, the distance between lips 111 and 121 are varied to conform the size of the opening defined by the funnel formed by lips 110, 120, 121, to the size of the mouth of a bag B to be filled. When a smaller 50-pound bag B is to be filled, guide member 115 is arranged to dispose lip 121 generally above rods 89b and, when a 1-pound bag B is to be used, the guide member 115 is arranged so as to dispose lip 121 generally above gripper 88c.

SWAY ARRESTER

As best seen in FIGS. 1 and 9, each of the frames 69 is provided with a sway arrester 130 which, when the indexing assembly acts upon the frame 69, prevents the inertia of the filled bag from swaying the bag as it is accelerated and decelerated between stations. The sway arrester 130 comprises a support arm 131 which projects forwardly of and beside the frame 69 at the appropriate location along the frame 69 to engage the bag B as the bag B tries to sway during indexing. The arm 131 is maintained in position by an adjustable support rod 132 affixed to the inner end of the arm 131 and slidably supported through a support sleeve 133. The support sleeve 133 is horizontally positioned behind and affixed between the channel members 70 of the frame 69. A locking bolt 134 threadedly received through the sleeve 133 selectively locks the rod 132 in any desired position in the sleeve 133. This permits the arm 131 to be moved transversely of the frame 69 to compensate for different size bags B that may be utilized with the machine. It must also be noted that the sleeve 133 is affixed to the channel members 70 in such a way that the sleeve 133 will not interfere with the operation of the platform 100. The arm 131 is provided with a protective covering 135 on the bag facing side thereof so as to prevent damage to the contents of the bags B when the machine is indexing.

BULK FILLING AND WEIGHING ASSEMBLY

Seen best in FIGS. 7, 8, and 9 is an upper roller 140 which is carried on the inner end portion of a stub shaft 141 mounted on upper bar 72. The shaft 141 protrudes radially of the indexing member, i.e., perpendicular to frame 69 as to space roller 140 inwardly of frame 69. The purpose of roller 140 is to ride over certain weighing tracks, to be disclosed hereinafter, so as to be lifted for suspending the frame 69 for weighing.

Below the roller 140, in generally vertical alignment therewith, is a second or lower roller 142 carried on the end of an inwardly extending stub shaft 143 mounted on bar 73. The sole function of roller 143 is to provide a means by which a platform 144 for supporting the bottom portion of a bag B is temporarily lifted into a bag-supporting position as the bulk of the material or articles are deposited in the bag B, in the bag-filling station or zone. This function will be explained more fully hereinafter.

As best seen in FIG. 8, as each frame 69 approaches its second quadrant position, i.e., the bulk-weighing station or zone, the roller 140 approaches weighing track 145. Track 145 is arcuate along a segment of a circle about upright shaft 24. Furthermore, the leading and trailing edges of track 145 are depressed to provide access and egress ramps for the track 145, whereby roller 140 is raised sufficiently that the entire weight of the bag suspending mechanism is supported by roller 140 on track 145.

Track 145, in turn, is itself carried by the ends of a pair of pivot arms 146, the other ends of which are pivotally connected to the lower end portions of a pair of downwardly extending support posts, 147, seen best in FIG. 1. The support poles 147 are vertically disposed standards which depend from the upper frame in the central position of the machine.

Springs 148, connected at their lower ends to an intermediate position of pivot arms 146, are suspended by a traveler block 149 and urge the arms 146 to pivot upwardly against a stop 146a which is fixed relative to the support posts 14. The traveler block 149, in turn, is threadedly carried by a vertically disposed externally threaded, tension-adjusting shaft 150 journaled for rotation in the upper frame. A sprocket 151 is connected to the upper end of shaft 150 and is driven by a drive sprocket 152 through a continuous chain 153. Chain 153 is encompassed by an open-ended tubular enclosure 154 carried by the upper frame. A crank 155, journaled at one end of casing 154 outwardly of the main frame 10 and connected to sprocket 152, rotates sprocket 152 to drive chain 153 and rotate sprocket 151. By manipulation of crank 155, shaft 150 is rotated, to raise or lower traveler block 149 and increase or decrease the initial tension of springs 149 that must be overcome to lower the arms 146 and track 145 away from the stop 146a.

It will be understood that springs 148 normally urge track 145 to the upper position against the stop 146a until weight on roller 140 overcomes the spring tension, at which time the track 145 as well as frame 69, will pivot downwardly. Surges in both upward movement an downward movement of track 145 or arm 146 are resisted by a dash not 156 having a plunger 157 connected to the upper frame.

A switch 160 detects the position of track 145 and controls the feed of articles to a bag B, as will be explained hereinafter.

BOTTOM REST ASSEMBLY

The bottom rest assembly is best understood by reference to FIG. 6. Therein it is seen that bottom platform 144 is supported by a parallelogram arrangement which permits roller 142 to lift platform 144 into place temporarily as roller 140 is received on track 145, thereby moving platform 144 into position beneath bag B as the bulk of the articles are received by bag B. Thus, as the bulk of the articles are received, the bag B will be supported from the bottom by platform 144, thereby minimizing the distortion of bag B as it is filled.

The parallelogram arrangement includes a pair of spaced parallel lower arms 161 and a pair of spaced parallel upper arms 162. The forward ends of lower arms 161 are connected together by a shaft 163 while the rear ends of arms 161 are connected together by a shaft 164. In like manner, shafts 165 and 166 connect forward and rear ends of arms 162.

Tubular collars 167 and 168 which are supported in their horizontal transverse positions by braces 16, journal shafts 163 and 165 in vertically spaced relationship for rotation about horizontal transverse axes. Tubular collars 170 and 171 on shafts 164 and 166 are welded to vertically disposed parallel angle irons 172. A plate 173 secured between angle irons 172 forms a backstop for bags B.

The platform 144 is provided with pins 174 which are selectively received in vertically spaced holes 175 in angle irons 172. By such an arrangement, the vertical position of platform 144 may be varied to accommodate various size bags B.

For cooperating with roller 142 so as to raise and lower platform 144, a cam strap 180, seen best inn FIG. 6, is provided for engagement and displacement upwardly by roller 142. The cam strap 180 is carried by and depends from a crossbar 181 located inwardly of angle irons 172 sufficiently for the lower position of frame 69 to pass therebetween, as arms 63 pass over the arms 162. Inverted L-shaped brackets 182 support the ends of crossbar 181 from an intermediate portion of arms 162. Hence, as roller 142 engages cam strap 180, the arms 161, 162 are lifted, pivoting about shafts 163, 165, to thereby raise angle irons 172, back plate 173 and platform 144 in essentially a vertical path so as to dispose platform 144 in a position temporarily supporting the bottom of each bag B as the frame 69 disposes such bag B in the bulk-filling zone.

FINAL WEIGHING ASSEMBLY

It will be understood that from the bulk-filling station or zone, each bag is carried in its rotary path to the final weighing station or zone in the third quadrant. At this location, each bag B is gradually filled to final weight and weighed quite accurately. The operation is best understood by reference to FIG. 7. In this figure, it is seen that an accurate balance scale or trim scale denoted generally by numeral 190, suspends, by means of chains 191, an arcuate weighing track 192 over which roller 140 passes. As with track 145, track 192 causes the roller 140 to be lifted, thereby suspending temporarily the weighing frame carrying bag B.

In more detail, the trim scale or weighing mechanism 190, as depicted in the present drawings, includes a sensitive detector 191 and a balance arm 192 operatively connected in the customary way to the detector 191. Any movement of balance arm 192 will be amplified by the detector 191 and be visible on the indicator arm thereof. A photoelectric cell 193 in the detector 191 will be actuated by any appreciable upward movement of the indicator arm of the detector 191.

One end of the balance scale carries the usual counterbalance weights 194 while the other end is connected through appropriate linkage 195 to a weight-detecting plate 196 for vertical movement by suspending straps 197 from the upper frame. Chains 191 are carried by the ends of angle irons 198 mounted on plate 196. Four such chains 191 at the corners of plate 196 suspend a rectangular frame 199 from which depends an L-shaped bracket 200, the lower horizontal arm of which projects outwardly and carries track 192.

RECEPTACLE DETECTOR

The presence or absence of a receptacle such as a bag B at bulk-weighing station is detected by a wand which projects inwardly from a bag detector switch 201, as seen in FIG. 8. Similarly, the presence or absence of a receptacle, such as bag B, is detected by a wand which projects inwardly from a switch 202, seen in FIG. 7.

Switch 201 is located appropriately in the second quadrant of the machine, i.e., in the bulk-filling zone so as to detect whether or not a bag B is available for filling. Also, switch 202 is located appropriately in the third quadrant, i.e., the final weighing station to detect the presence of a bag B in that zone for filling.

CONVEYOR SYSTEM

Figure 2:
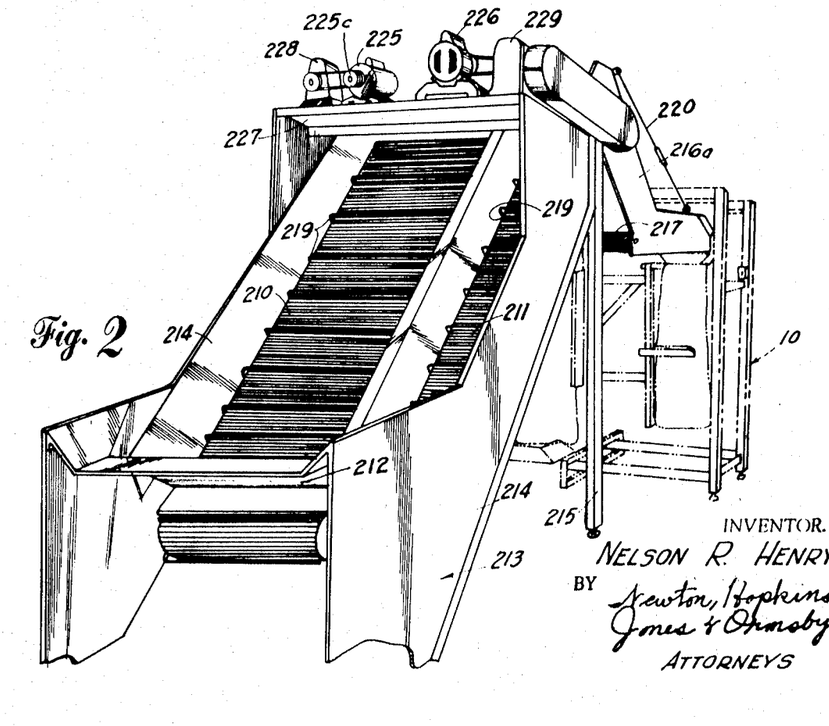
FIG. 2 is a rear perspective view of the machine shown in FIG. 1.
Figure 3:
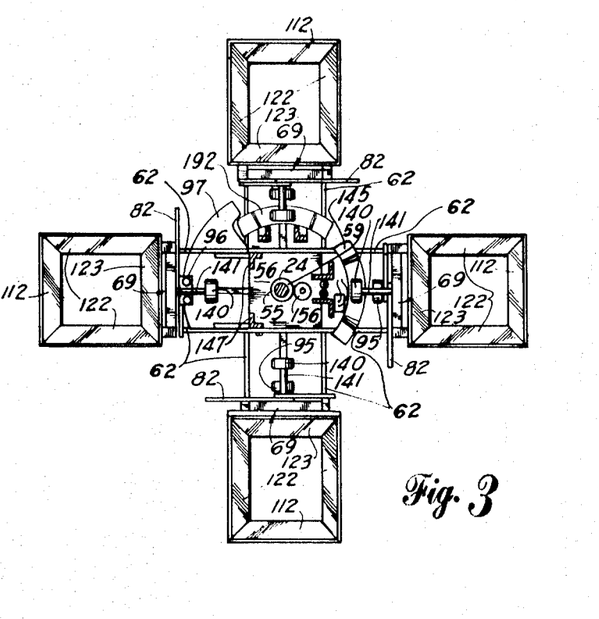
FIG. 3 is a top plan view detail of a portion of the machine shown in FIG. 1 showing the central shaft and bag-supporting receptacles thereof.

As seen in FIG. 2, there are two separately operated conveyor systems, which are disposed side by side. One conveyor system includes an upwardly and forwardly inclined bulk infeed conveyor 210 and the other system includes the upwardly and forwardly inclined or dribble feed conveyor 211. A common infeed hopper 212 feeds to the infeed end of both conveyors 210 and 211.

For supporting the conveyors 210, 211 and hopper 212, a conveyor frame 213 is provided adjacent the rear side of the main frame 10, as illustrated in FIGS. 1 and 2. Frame 213 includes a pair of opposed parallel, vertically disposed, paced, side panels 214, the rearmost portions of which rest on the supporting surface. Forwardly of the rearmost portions, the panels 214 incline upwardly and forwardly to terminate into frame 10. A pair of upright legs 215 support the upper end portions of panels 214.

Between the legs 215 and frame 10, downwardly and forwardly inclined plates 216a, 216b, 216c, and 216d define a pair of spaced forwardly an downwardly inclined chutes respectively terminating in the third quadrant and the second quadrant of the machine and being supported by the cable 220, as shown in FIG. 2. Trim discharge conveyor 217 and bulk discharge conveyor 218 are respectively carried between plates 216a, 216b and between plates 210c and 216d.

It will be understood that conveyors 210 and 211, 217, and 218 are each transverse slat-type continuous conveyors and that conveyors 210 and 211 have spaced transverse upstanding paddles 219 for the purpose of lifting the articles P, such as potatoes, apples, citrus fruits, coal, or other aggregate material. The discharge end of conveyor 210 and 211 discharge onto conveyors 218 and 217, respectively.

Appropriate motors 225 and 226 on a platform 227 drive gear reducer 228 and 229, respectively. The gear reducer 228, in turn, drives the bulk conveyors 210 and 218 in synchronization. In like manner, gear reducer 228 turns trim conveyors 211 and 217 in synchronization.

ELECTRICAL SYSTEM

The following table I gives a brief breakdown of the function of each switch in the machine here illustrated:

TABLE I

| Switch Mechanism | |
| --- | --- |
| Switch | |
| 52 | Prevents operation of conveyors unless rotary section is in proper position for filling bags |
| 160 | Controls conveyors 210, 218 |
| 201 | Detects bag at bulk fill station |
| 202 | Detects bag at dribble fill station |
| 230 | Off-on switch to supply current to machine |
| 250 | Controls indexing clutch 48 |
| Photoelectric Cell | |
| 193 | Controls conveyors 211, 217 |
| E1, E2 | Emergency stop switches |

Figure 12:
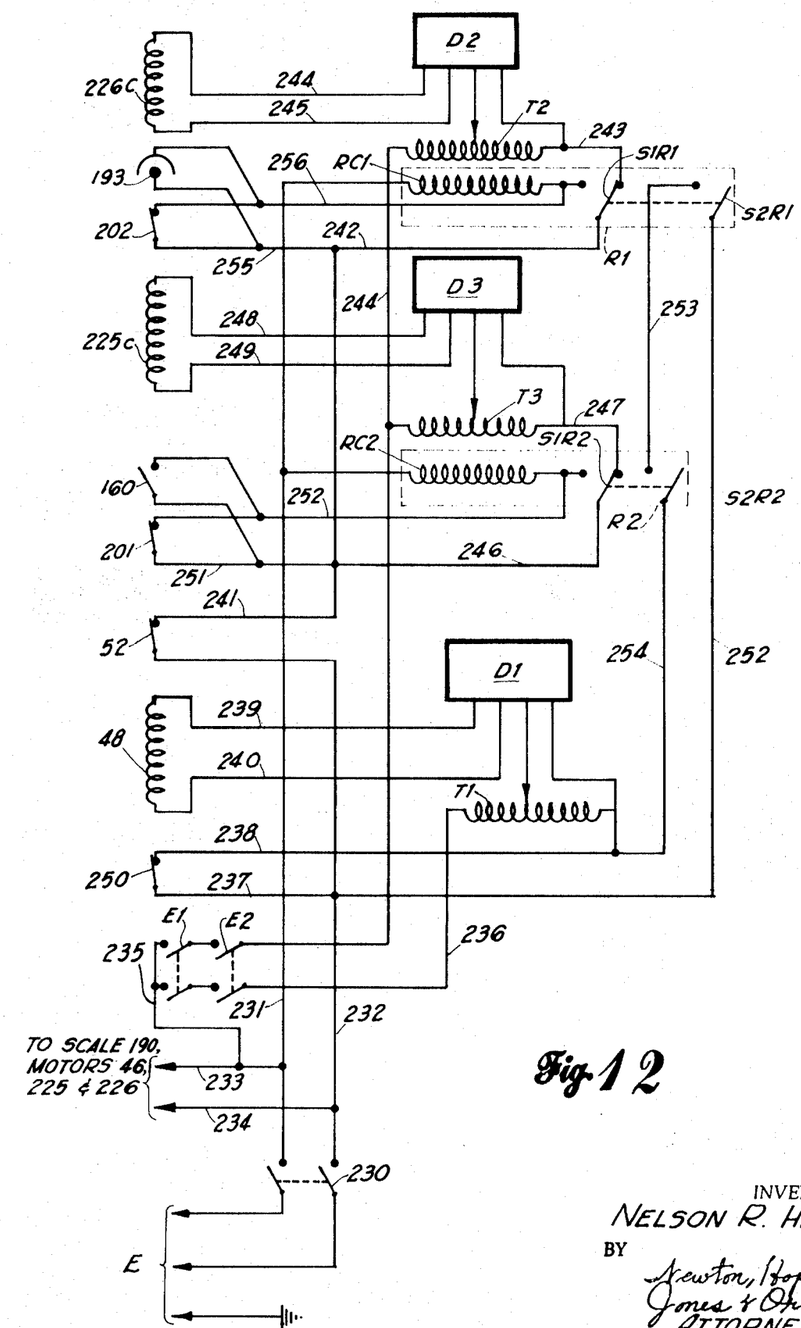

In more detail, the on-off switch 230, when closed, supplied single-phase 200-volt current from a source of current E through two hot wires 231 and 232. Thence, wires, such as wires 233 and 234, supply current for operating the scales 190, motor 46, motor 225 and motor 226. Therefore, it will be understood that when switch 230 is closed to turn the machine on, the motors 46, 225, and 226 are continuously operating. The actual control is by electrical clutches connected to each motor, motor 46 having clutch 48, motor 225 having clutch 225c and motor 226 having clutch 226c. These clutches 48, 225c and 226c must be energized before the respective motors are effective.

From wire 233, wire 235 leads through various normally closed emergency switches E1, E2, etc., which are located on various parts of the machine and through wire 236 to one side of an autotransformer T1 which, in turn, supplies current to an index rectifier D1.

Current from wire 232 to complete the circuit to autotransformer T1 is supplied in wires 237, 238 and switch 250, to the other side of autotransformer T1, provided switch 250 is closed. In such an event, DC current from rectifier D1, via wires 239 and 240, is supplied to clutch 48 of motor 46.

Switch 250 is mounted on the bottom of gear reducer 45 and is activated by a cam 250a mounted on the shaft 44. The cam 250a holds the switch 250 open when the cam 250a is in its normal position but allows the switch 250 to close during indexing. Therefore, current is supplied through switch 250 when the indexing member is in the process of indexing.

Wire 232 also leads to the normally closed switch 52 which, when the indexing member is indexing, is held open by the peripheral edge of disc 34. After indexing, the arm of switch 52 falls into any one of the recesses 35, thereby closing switch 52. Therefore, only when the indexing members are in their normal position will the switch 52 supply current by wires 241, 242, switch S1R1 and wire 243 to autotransformer T2. The other side of autotransformer T2 is connected to bus 244 which is connected to wire 233 through the emergency switches E1, E2. When the machine is not indexing, current is supplied to the autotransformer T2 and to rectifier D2 which, in turn, provides current through wires 244 and 245 to energize clutch 226c and operate the dribble conveyor 211.

In similar fashion, clutch 225c is also energized.

In more detail, current from wire 241 is supplied by wire 246 and relay switch S1R2 to wire 247 and thence to autotransformer T3, the other side of autotransformer T3 being connected to wire 244. The autotransformer T3, then, supplies current to rectifier D3 which through wires 248 and 249 supplies current to energize clutch 225c to operate the conveyor 210.

The bulk conveyor 210 is controlled through relay R2 which has its coil RC2 connected at one side to wire 231. The other side of coil RC2 is connected to wire 241 through the normally open contacts of switch S1R2, the normally closed switch 201, and normally open switch 160 in parallel. Switch 201 opens when a bag is indexed into position under the bulk conveyor 210 and switch 160 closes when a predetermined weight of material has been deposited in the bag. If a bag is not in position or the material has been deposited in the bag, coil RC2 is energized thereby transferring switch S1R2 to maintain coil RC2 energized even though switches 160 or 201 may open. This also closes switch S2R2 of relay R2 which is connected to autotransformer T1 through wire 254 as will be explained hereinafter.

The dribble conveyor 211 is controlled by relay R1 which has one side of its coil RC1 connected to wire 231. The other side of coil RC1 is connected to wire 241 through the normally open contacts of switch S1R1, the photoelectric cell 193, and the switch 202 in parallel. The switch 202 opens when a partially filled bag is indexed into position under the dribble conveyor 211 and the photoelectric cell 193 is closed when the material has been deposited into the bag to the final weight. When switch 202 or photoelectric cell 193 is closed, switch S1R1 transfers and maintains coil RC1 energized even though switch 202 or the photoelectric cell 93 may open. This also closes switch S2R1 of relay R1 which is connected to switch S2R2 through wire 253 and to wire 232 through wire 252.

The switches S2R1 and S2R2 serve to start the indexing operation when they are both closed by energizing clutch 48 through autotransformer R1 and rectifier D1. After indexing starts, switch 52 opens thereby deenergizing coils RC1 and RC2 to open switches S2R1 and S2R2, however, switch 250 is now closed to maintain the indexing operation.

OPERATION

From the foregoing description, the operation of the present operation should be apparent. The machine is cut on by the closing of switch 230. At that time, the indexing member will commence intermittent rotation, providing approximately a 2-second dwell for a respective frame 69 to be in a particular zone. If no bags are installed in the machine, it will continue to its intermittent rotation. This is achieved since switch 52 is normally closed to supply current by lines 241 and normally closed switches 201 and 202 to energize coils RC1 and RC2.

The energizing of coils RC1 and RC2 causes the closing of switches S2R1 and S2R2 to provide a circuit through the autotransformer T1 to energize clutch 48. Clutch 48, upon being energized, causes the rotation of pitman 43. It will be seen in FIG. 4 that the arm 33 is normally in an intermediate position between pin adjacent pins 36 and, therefore, upon initial movement of the pitman, the arm 33 will be moved clockwise, causing no rotation of the disk until the pitman 43 reaches the extent of its stroke and thereafter moves the arm 33 in a counterclockwise direction. At this stage, the pawl 38 engages shaft 36 which is in the fourth quadrant and causes movement of this shaft to the first quadrant, thereby indexing disk 34 through 90° C.

As indexing of disk 34 begins, switch arm 52 rides out of the recess 35 and onto the periphery of disk 34. At such tim, the switch 52 is opened to interrupt current to the relay coils RC1 and RC2. It will be remembered however, that upon initial movement of pitman 43 and cam 250a, the switch 250 will be closed to create a circuit from wire 232 through wires 237 and 238 to maintain the autotransformer T1 in an energized condition. Hence, the clutch 48 remains energized until switch 250 is again open by cam 250a upon its completion of one revolution.

In the event that no bags are detected by either switch 201 or switch 202, coils RC1 and RC2 will again be energized because switches 201 and 202 are closed, thereby repeating the indexing cycle. The indexing cycle will be repeated so long as switch 230 remains closed and no bags are presented to the machine.

The operator stands adjacent the first quadrant, i.e., adjacent platform 20, and there is sufficient pause between each cycle of the machine to permit the installation of a bag B on the frame 69. The installation of the bag B in place is accomplished manually, the operator holding the rim or lip of the bag B.

In installing a bag B, the operator inserts the edge of the bag upwardly between the grippers 88a and the rods 89a. Once inserted, the spring loading of the grippers 88a will firmly hold the upper edge portion of the bag B in place. Thereafter, depending upon whether or not the bag is 5-pound bag or a 100-pound bag, the edge portion of the bag is inserted between the grippers 88b and the rods 89b or between the grippers 88c and rods 89c. The larger bag, of course, is received between the grippers 88c and their respective rods 89c since such grippers are spaced further from the grippers 88a then the grippers 88b.

It will be understood, of course, that prior to the closing of switch 230 to commence operations, the platform 100, as seen in FIG. 9, will be removed since it has no use in conjunction with bags B. Also, the position of the sway arrester arm 130 will be adjusted to suit the particular size of bag. Furthermore, appropriate weights 194 will be placed upon the scale 190, seen in FIG. 8, and the crank 155 manipulated so that platform 145, seen in FIG. 8, will be depressed at an appropriate time when approximately 90° percent of the bulk or weight of material P is received in a bag at the bulk filling station.

By the installation of successive bags, as hereinabove described, the machine is caused automatically to operate to fill these bags and then discharge the same successively. The bag, after being installed in the first quadrant, is transported to the second quadrant, at which time it strikes the wand D of switch 201 causing the switch to be opened. The opening of switch 201 opens the circuit to coil RC2 so that RC2 will not be energized when switch 52 closes. It will be remembered that switch 250 is opened when pitman 43 is in its normal position. Hence, the current via rectifier D1 to coil 48 is interrupted. Therefore, no additional indexing of the indexing member takes place.

It will be remembered that there is circuit made to autotransformer T3 through switch S1R2 upon the deenergization of coil RC2. Since coil RC2 is in a deenergized position, at this stage of operation, current is supplied to the autotransformer T3 and thence through rectifier D3 to energize clutch 225c. This energization of clutch 225c causes the actuation of conveyors 210 and 218, thereby feeding material P to the bulk-feeding zone. It will be understood that the inclined conveyor 210 has the space patterns against which the material P collects and, if this conveyor discharges directly to the filling zone, it would cause groups of the articles to be discharged intermittently. By discharging to conveyor 218, the material P tends to spread out and therefore is more evenly fed to the bulk-filling zone.

When sufficient material P has been received, the bag B will weigh enough that roller 140 will depress track 145, thereby closing switch 160. The closing of switch 160 causes energization of coil RC2, thereby throwing switches S1R2, and S2R2, i.e., creating a holddown circuit for the relay RC2 through wire 246 and deenergizing, at the same time, the clutch 225c. Furthermore, a circuit is made to the autotransformer T1 and hence, clutch 48 is energized. Thus, the indexing cycle is cased to be repeated, thereby advancing each bag through 90°. In other words, the bag which had received the bulk of its weight in the second quadrant, is now transferred to the third quadrant, or the final weighing station.

The switch 202 detects the presence of the bag B, opening the circuit to coil RC1 so that RC1 will not be energized when switch 52 closes. Since the circuit is broken by switches S2R2 and S2R1 to the autotransformer T1, and since switch 250 is opened by the proper positioning of pitman 43, the autotransformer T1 is deenergized, thereby deenergizing coil 48. The switch S1R1 in its position as shown in FIG. 12 creates a circuit through the autotransformer T2 and rectifier D2 to energize clutch 226c which, in turn, causes the trim feed or dribble feed conveyors 211 and 217 to be actuated to deliver material, to the bag B in the final weighing zone. As this bag approaches its final weight, the indicator arm of detector 191 begins to move upwardly, thereby interrupting the light to photoelectric cell 193 to close a circuit through wires 255 and 256 to coil RC1. This momentary energization of coil RC1 causes the throwing of switches S1R1 and S2R1 so that the switch S1R1 creates a holddown circuit for coil RC1.

In the event that a subsequent bag has been filled in the bulk-filling zone, as previously described, switch 160 will be closed, thereby creating an energized coil RC2 which is held down through the circuit including switch S1R2. Therefore, a circuit including wires 252, 253, and 254 is completed through switches S2R2 and S2R1 to energize the autotransformer T1 and thereby energize clutch 48. Therefore, when both the bag in the bulk-filling zone and the bag in the trim-filling zone have been filled to their prescribed weights, for that particular zone, the indexing member again indexes so as to bring the filled bag into the fourth quadrant and the partially filled bag into the third quadrant where the filling operation is repeated. In the fourth quadrant, the bag B, which has been previously filled to prescribed weight, is automatically dropped. It may then be removed manually or, if desired, the fourth quadrant may be provided with a conveyor (not shown) which carries the bag away from the machine.

It will be remembered that the mechanism for dropping the bag includes the cam 96 and the roller 95, seen best in FIG. 9. As the roller 95 passes beneath the cam 96, it is depressed downwardly against the tension of spring 85, thereby pivoting downwardly the levers 82 simultaneously. This pivots the rock shafts 81 so as to pivot downwardly the actuator plates 79, depressing simultaneously all pins 91 so as to pivot the grippers 88a, 88b, and 88c away from their respective rods 89a, 89b and 89c.

It is now seen that the bags are held stationary as they are filled and therefore no sidewise movement of the bags is imparted thereto. When each bag is filled in its bulk-filling zone, a platform 144 is automatically moved therebeneath in order to support the bag from the bottom and to prevent distortion of the bag. This platform 144 may be adjusted vertically to accommodate various size bags. The sway arrester, including the sway arrester arm 130, prevents sidewise movement of the bag, when the indexing indexes.

The guide member 115 is adjustable so as to define an opening for the chute of each bag-supporting member which is appropriate for the particular bag employed.

In the event that boxes are to be used in place of the bags herein described, the platform 100 is installed on each of the frames 69 and the machine is then operated in the same manner as heretofore described, except the operator manually installs a box on each platform 100 as the platform is presented to him in the first quadrant. It will be understood, of course, that each box (not shown) must be so positioned to engage the wands of switches 201 and 202 for the proper functioning of the machine.

While I have described the present invention with respect to articles such as potatoes and other produce, it will be quite apparent that this versatile machine is capable of handling many different aggregate materials without major modification of the various elements thereof and will be obvious to those skilled in the art that many variations may be made in the embodiments here chosen for the purpose of illustrating the present invention without departing from the scope thereof.

I claim:

1. In a method of filling and weighing bags the steps of supporting flexible bags by only their upper edge portions and while being so supported, feeding them successively along a prescribed path leading through a filling zone, then additionally supporting said bags by their bottom portions during only the periods in which said bags are in the vicinity of said filling zone, and discharging prescribed amounts of material to said bags while they are supported by their bottom portions.

2. In a method of filling and weighing receptacles, the steps of cyclically feeding successive receptacles along a prescribed path leading through a bulk-filling zone and then through a trim-filling zone, while periodically stopping the feeding of said receptacles so as to position successive of said receptacles at said bulk-filling zone during successive periods in which said feeding is stopped and to also position such receptacles thereafter and during subsequent of said periods at said trim-filling zone, respectively feeding material to said receptacles in the respective zones until such receptacles in both of said zones have received prescribed amounts of said material, detecting when said receptacles have received such material, and thereafter continuing the cycles while discharging the filled receptacles;
 a. wherein said receptacles are bags and wherein said bags are supported by their upper edge portions during their movement along said path; and
 b. wherein the bottom portions of said bags are supported during the time that said receptacles are each in said bulk-filling zone.

3. The method set forth in claim 2 wherein said bags when supported are releasably engaged by their upper edge portions and held with the mouth of said bag being open during movement along said path and wherein excessive lateral movement of said bags is arrested.

4. The method set forth in claim 2 wherein the step of detecting when the receptacles have received the material includes successively suspending said receptacles for weighing during the periods when the receptacles are in the zones.

5. In a weighing and filling mechanism:
 a. a frame;
 b. a receptacle-supporting member movable with respect to said frame and adapted to receive and support a receptacle to be filled and weighed;
 c. means on said frame and connected to said receptacle-supporting member for moving said receptacle-supporting member along a prescribed path and to position said receptacle in a filling zone adjacent said frame and for permitting vertical movement of said receptacle-supporting member while maintaining physical contact with said means;
 d. weighing means adjacent the path of movement of said receptacle-supporting member for receiving and weighing said receptacle-supporting member and said receptacle when they are moved relative to said weighing means into said zone; and
 e. control means responsive to said weighing means for discharging material into said receptacle in said zone.

6. The mechanism set forth in claim 5 including detection means operatively connected to said control means for detecting the presence of a receptacle in said filling zone and for preventing said discharge of material except when said receptacle is in said filling zone.

7. The mechanism set forth in claim 5 wherein said means for moving said receptacle supporting member along a prescribed path includes:
 a. a power source; and
 b. laterally extending arm means connected to said power source and said receptacle supporting member for imparting power to said receptacle supporting member for moving said receptacle in a horizontal path while permitting suspension of said receptacle by said weighing means.

8. The mechanism set forth in claim 5 including;
 a. a movable platform for supporting said receptacle; and,
 b. means for temporarily moving said platform into a position beneath said receptacle during at least a portion of the period in which said receptacle is in said zone.

9. In a filling and weighing mechanism:
 a. means for supporting receptacles and for moving said receptacles in succession first through a bulk-filling zone and then through a trim filling zone;
 b. a bulk conveyor for feeding articles to a receptacle in said bulk-filling zone;
 c. a trim conveyor for feeding articles to a receptacle in said trim-filling zone;
 d. means for actuating said bulk conveyor;
 e. means for actuating said trim conveyor;
 f. control means responsive to the filling of prescribed amounts in said receptacles in both of said zones for controlling the movement of said receptacles;
 g. vertically disposed means actuated by said control means; and
 h. arms extending from said vertically disposed means for supporting said first mentioned means for movement by said arms along a prescribed path;
 i. wherein said vertically disposed means includes an indexing member for rotation about a vertical axis; and
 j. a supporting frame carried by said arms for movement in a rotary path, said arms being pivotally connected by their ends at vertically spaced locations to said supporting frame for pivoting about axes approximately perpendicular to the path of travel of said supporting frame and for permitting vertical movement of said supporting frame while it is moved.

10. The structure defined in claim 9 including means for controlling said means for actuating said bulk conveyor and said means for actuating said trim conveyor so as to deactuate said bulk conveyor and said trim conveyor during the period in which said receptacle is moved.

11. The mechanism defined in claim 9 wherein said control means includes:
 a. a track in each of said zones for successively receiving and suspending said means for supporting said receptacle in such zones;
 b. weighing means connected respectively to each track in each of said zones for determining when prescribed amounts of articles have been discharged into said receptacles; and
 c. means responsive to said weighing means for controlling said trim conveyor and said bulk conveyor.

12. In a filling and weighing mechanism:
 a. an indexing member comprising a vertical shaft;
 b. four bag-supporting units mounted on said shaft by structure extending radially outward therefrom, said bag-supporting units being spaced at intervals of 90° around said shaft and each such unit including means for gripping and supporting a bag, in open position, by its upper edge;
 c. means for intermittently rotating said shaft through 90° angles;
 d. four stations spaced around the path traveled by the bag-supporting units during such rotation and including (1) a station at which a bag may be applied to a supporting unit (2) a bulk delivery station, (3) a trim delivery station and (4) a bag removal station;
 e. conveyor means for supplying articles at a high rate of speed to a bag at said bulk delivery station;
 f. conveyor means for supplying articles at a substantially lower rate of speed to a bag at said trim delivery station;
  g. means engageable by a bag-supporting means at said bulk delivery station and responsive to the weight of articles in said bag to shut off the conveyor delivering articles to such bag when the weight delevered reaches a predetermined amount;

h. means engageable by a bag-supporting means at said trim delivery station and responsive to the weight of articles in said bag to shut off the conveyor delivering articles to such bag when the weight of articles delivered reaches a second predetermined amount; and i. means for preventing rotation of said vertical shaft during a period of delivery until bags at both bulk and trim delivery stations have received their predetermined weight of articles.

13. A filling and weighing mechanism as in claim 12 wherein said bag support engaging means at said bulk delivery station includes a resiliently supported track and said bag-supporting means includes a roller adapted to ride up on to said track so that the bag supporting means will be supported by said track.

14. A filling and weighing mechanism as in claim 12 wherein said bag support engaging means at said trim delivery station includes a track section supported by one end of a balance scale and said bag-supporting means includes a roller adapted to ride up on to said track section so that the bag-supporting means will be supported thereby.

15. In a weighing and filling mechanism of the type for filling and weighing a receptacle, a scale provided with a weight-receiving element movable for actuating said scale, a carrier for said receptacle and means for moving said carrier and the receptacle along a prescribed path and for depositing said carrier and said receptacle upon said weight-receiving element, said means including a linkage maintaining physical contact between said element and said carrier for moving said carrier along a prescribed path normal to the movement of said weight-receiving element while permitting movement of said carrier in the direction of movement of said weight-receiving element.

16. The mechanism set forth in claim 15 wherein said linkage includes a parallelogram linkage arrangement disposed for shifting vertically.

17. The mechanism set forth in claim 15 wherein said weight-receiving element includes a platform and said carrier includes a roller movable onto and off of said platform.

18. The mechanism set forth in claim 15 wherein said linkage includes a vertical axle and a radially extending arm, said radially extending arm being movable about said axle and being connected at its outer extremity to said carrier for moving said carrier in a rotary path past said weight-receiving element.

19. The mechanism set forth in claim 15 including control means responsive to the depositing of material in said receptacle for actuating and deactuating said means for moving said carrier.

20. The mechanism set forth in claim 19 including a conveyor for delivering material to said receptacles and wherein said control means includes means responsive to said scale for interrupting the delivery of material to said receptacle by said conveyor.

21. The mechanism set forth in claim 19 wherein said carrier includes means for supporting said receptacle by its edge portions and including a support movable into position to support the bottom portion of said receptacle when said carrier and receptacle are deposited on said element.

* * * * *